| (12) | United States Patent | (10) Patent No.: | US 9,460,550 B2 |
|---|---|---|---|
| | Kubota | (45) Date of Patent: | Oct. 4, 2016 |

(54) MULTI-VIEWPOINT IMAGE GENERATION APPARATUS AND METHOD

(71) Applicant: JVC Kenwood Corporation, Yokohama-shi, Kanagawa (JP)

(72) Inventor: Kenji Kubota, Kanagawa (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 296 days.

(21) Appl. No.: 14/036,064

(22) Filed: Sep. 25, 2013

(65) Prior Publication Data

US 2014/0092086 A1 Apr. 3, 2014

(30) Foreign Application Priority Data

Sep. 28, 2012 (JP) ................................ 2012-215568

(51) Int. Cl.
 *G06T 15/20* (2011.01)
 *H04N 13/00* (2006.01)
 *H04N 13/02* (2006.01)

(52) U.S. Cl.
 CPC ........... *G06T 15/20* (2013.01); *H04N 13/0011* (2013.01); *H04N 13/0282* (2013.01)

(58) Field of Classification Search
 None
 See application file for complete search history.

(56) References Cited

U.S. PATENT DOCUMENTS

| 2011/0080400 A1* | 4/2011 | Yamada | ............... | H04N 13/026 345/419 |
|---|---|---|---|---|
| 2012/0194514 A1* | 8/2012 | Sakaguchi | ......... | H04N 13/0011 345/419 |
| 2012/0212480 A1* | 8/2012 | Cho | ...................... | G06T 15/205 345/419 |

FOREIGN PATENT DOCUMENTS

| JP | 2001346226 | | 12/2001 |
|---|---|---|---|
| JP | 2005151534 | A | 6/2005 |
| JP | 2006163547 | A | 6/2006 |
| JP | 2009124308 | A | 6/2009 |
| JP | 2012138885 | A | 7/2012 |

OTHER PUBLICATIONS

Official Action issued on Sep. 29, 2015 in the counterpart Japanese Application No. 2012-215568, and its English translation.

* cited by examiner

*Primary Examiner* — Sultana M Zalalee
(74) *Attorney, Agent, or Firm* — Nath, Goldberg & Meyer; Jerald L. Meyer (57) ABSTRACT

A viewpoint position determination unit is configured to determine whether a viewpoint indicated by a viewpoint array signal is closer to a left-eye viewpoint or a right-eye viewpoint. A coefficient generation unit is configured to generate a coefficient based on the viewpoint array signal. A first selector is configured to select either a left-eye viewpoint image signal or a right-eye viewpoint image signal. A second selector is configured to select either a left-eye viewpoint depth value or a right-eye viewpoint depth value. A multiplier is configured to multiply the left-eye viewpoint depth value or the right-eye viewpoint depth value by the coefficient. A pixel shift unit is configured to carry out a pixel shift on the left-eye viewpoint image signal and the right-eye viewpoint image signal according to the depth value output from the multiplier, so as to generate a multi-viewpoint image signal.

4 Claims, 7 Drawing Sheets

MULTI-VIEWPOINT IMAGE GENERATION APPARATUS AND METHOD

CROSS REFERENCE TO RELATED APPLICATION

This application is based upon and claims the benefit of priority under 35 U.S.C. §119 from Japanese Patent Applications No. 2012-215568, filed on Sep. 28, 2012, the entire contents of which are incorporated herein by reference.

BACKGROUND

The embodiments relate to a multi-viewpoint image generation apparatus and method to generate a multi-viewpoint image signal of more than two viewpoints based on image signals of two viewpoints.

For example, Japanese Patent Unexamined Publication No. 2001-346226 (Patent Literature 1) describes a multi-viewpoint image generation apparatus that generates a multi-viewpoint image signal of more than two viewpoints based on image signals of two viewpoints that are a left-eye viewpoint image signal and a right-eye viewpoint image signal.

The multi-viewpoint image generation apparatus described in Patent Literature 1 performs parallax mapping indicating a parallax between viewpoint images extracted from the image signals of the two viewpoints, so as to generate the multi-viewpoint image signal by use of the parallax mapping.

SUMMARY

The images of the two viewpoints include an area that is visible to one viewpoint but is not visible to the other viewpoint, which is so-called occlusion. Thus, the parallax mapping can hardly be performed properly by use of the image signals of the two viewpoints. As a result, the multi-viewpoint image signal generated by the parallax mapping exhibits a distortion.

It is an object of the embodiments to provide a multi-viewpoint image generation apparatus and method capable of obtaining a multi-viewpoint image signal without distortion.

In order to solve the above-described conventional problem, a first aspect of the embodiments provides a multi-viewpoint image generation apparatus, comprising: a basic depth model generation unit configured to generate a basic depth model that indicates a depth value of a predetermined scene structure in a frame; a left-eye viewpoint image object information generation unit configured to estimate concave-convex information of an object in an image based on a left-eye viewpoint image signal so as to generate a left-eye viewpoint concave-convex value; a right-eye viewpoint image object information generation unit configured to estimate the concave-convex information of the object in the image based on a right-eye viewpoint image signal so as to generate a right-eye viewpoint concave-convex value; a first adder that adds the basic depth model to the left-eye viewpoint concave-convex value so as to generate a left-eye viewpoint depth value; a second adder that adds the basic depth model to the right-eye viewpoint concave-convex value so as to generate a right-eye viewpoint depth value; a viewpoint array signal generation unit configured to generate a viewpoint array signal that maps one of a set of viewpoints to a pixel position in the frame; and a multi-viewpoint image signal generation unit configured to generate a multi-viewpoint image signal of more than two viewpoints based on the left-eye viewpoint image signal, the right-eye viewpoint image signal, the left-eye viewpoint depth value, the right-eye viewpoint depth value and the viewpoint array signal, wherein the multi-viewpoint image signal generation unit comprises: a viewpoint position determination unit configured to determine whether the viewpoint indicated by the viewpoint array signal is closer to a left-eye viewpoint or a right-eye viewpoint; a coefficient generation unit configured to generate a coefficient that is a positive number and increases in size as the distance of the viewpoint from the right side of the left-eye viewpoint or the right-eye viewpoint increases, and configured to generate a coefficient that is a negative number and increases in size as the distance of the viewpoint from the left side of the left-eye viewpoint or the right-eye viewpoint increases; a first selector that selects either the left-eye viewpoint image signal or the right-eye viewpoint image signal based on a result determined by the viewpoint position determination unit; a second selector that selects either the left-eye viewpoint depth value or the right-eye viewpoint depth value based on the result determined by the viewpoint position determination unit; a multiplier that multiplies the left-eye viewpoint depth value or the right-eye viewpoint depth value selected by the second selector, by the coefficient generated by the coefficient generation unit; and a pixel shift unit that carries out a pixel shift on the left-eye viewpoint image signal or the right-eye viewpoint image signal selected by the first selector according to the depth value output from the multiplier, so as to generate the multi-viewpoint image signal.

A second aspect of the embodiments provides a multi-viewpoint image generation method, comprising: estimating concave-convex information of an object in an image based on a left-eye viewpoint image signal so as to generate a left-eye viewpoint concave-convex value; estimating the concave-convex information of the object in the image based on a right-eye viewpoint image signal so as to generate a right-eye viewpoint concave-convex value; adding a basic depth model indicating a depth value of a predetermined scene in a frame to the left-eye viewpoint concave-convex value so as to generate a left-eye viewpoint depth value; adding the basic depth model to the right-eye viewpoint concave-convex value so as to generate a right-eye viewpoint depth value; generating a viewpoint array signal that maps one of a set of viewpoints to a pixel position in the frame; determining whether the viewpoint indicated by the viewpoint array signal is closer to a left-eye viewpoint or a right-eye viewpoint; generating a coefficient that is a positive number and increases in size as the distance of the viewpoint from the right side of the left-eye viewpoint or the right-eye viewpoint increases, and generating a coefficient that is a negative number and increases in size as the distance of the viewpoint from the left side of the left-eye viewpoint or the right-eye viewpoint increases; selecting either the left-eye viewpoint image signal or the right-eye viewpoint image signal depending on whether the viewpoint indicated by the viewpoint array signal is closer to the left-eye viewpoint or the right-eye viewpoint; selecting either the left-eye viewpoint depth value or the right-eye viewpoint depth value depending on whether the viewpoint indicated by the viewpoint array signal is closer to the left-eye viewpoint or the right-eye viewpoint; multiplying, by the coefficient, the left-eye viewpoint depth value or the right-eye viewpoint depth value selected; and carrying out a pixel shift on the left-eye viewpoint image signal and the right-eye viewpoint image signal according to the left-eye viewpoint depth value or the right-eye viewpoint depth value multiplied by the coefficient, so as to generate the multi-viewpoint image signal.

DETAILED DESCRIPTION

Figure 1:
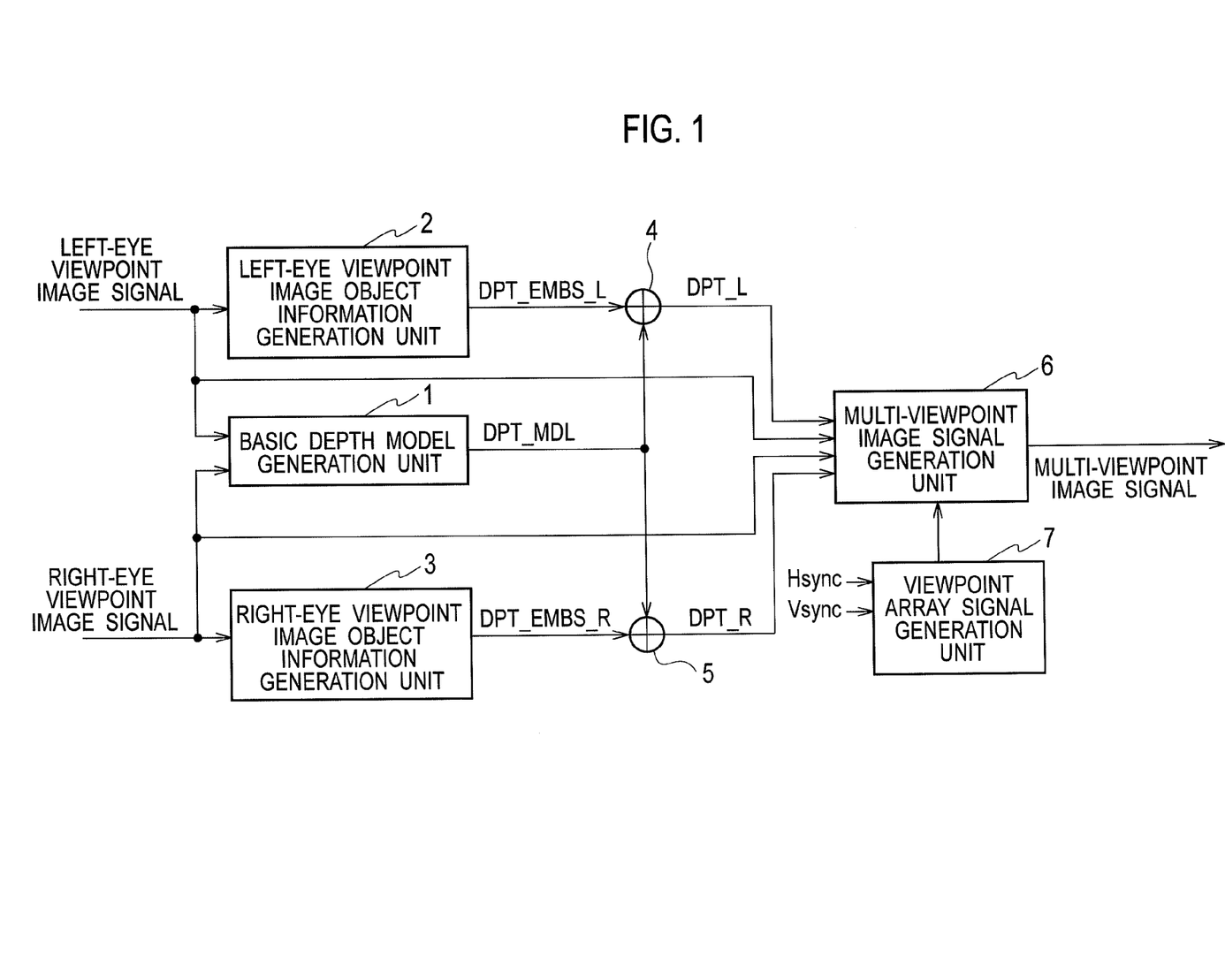
FIG. 1 is a block diagram showing a multi-viewpoint image generation apparatus according to an embodiment.

Hereinafter, a multi-viewpoint image generation apparatus and method according to the embodiments will be explained with reference to the attached drawings. As shown in FIG. 1, the multi-viewpoint image generation apparatus according to the embodiments includes a basic depth model generation unit 1, a left-eye viewpoint image object information generation unit 2, a right-eye viewpoint image object information generation unit 3, an adder 4, an adder 5, a multi-viewpoint image signal generation unit 6 and a viewpoint array signal generation unit 7.

Figure 2:
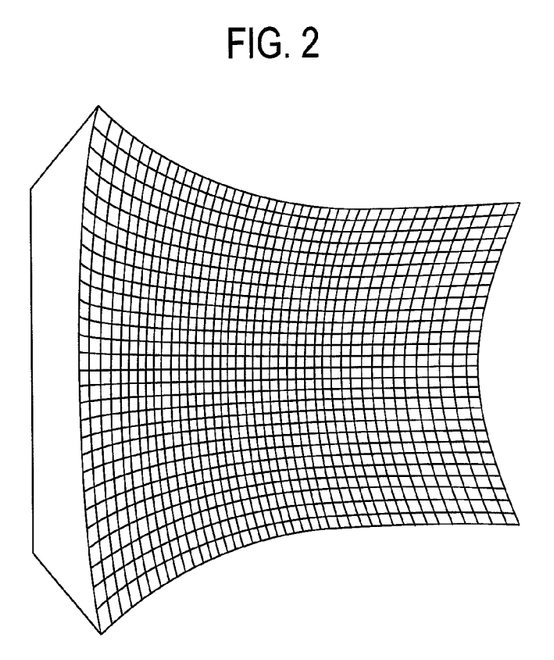
FIG. 2 is an example of a three-dimensional structure of a basic depth model (Type 1) generated by the basic depth model generation unit 1 in FIG. 1.
Figure 3:
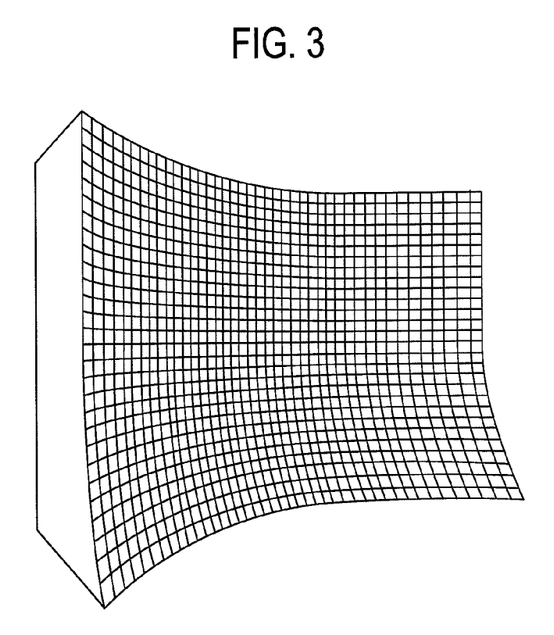
FIG. 3 is another example of the three-dimensional structure of the basic depth model (Type 2) generated by the basic depth model generation unit 1 in FIG. 1.
Figure 4:
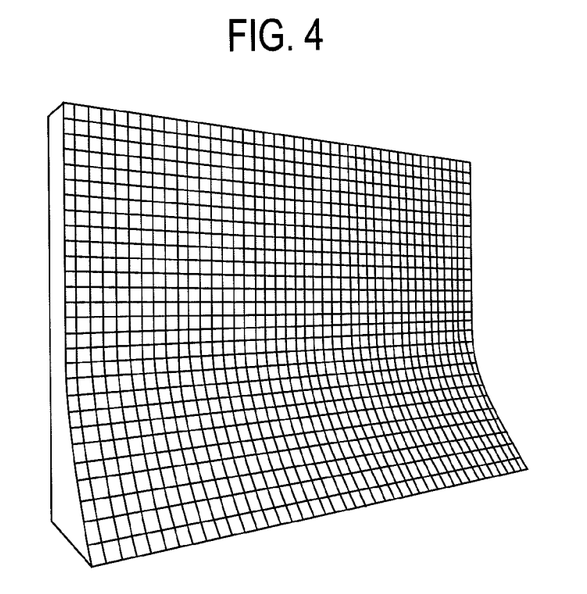
FIG. 4 is still another example of the three-dimensional structure of the basic depth model (Type 3) generated by the basic depth model generation unit 1 in FIG. 1.

The basic depth model generation unit 1 stores, for example, basic depth models shown in FIG. 2 to FIG. 4. The basic depth models shown in FIG. 2, FIG. 3 and FIG. 4 are referred to as Type 1, Type 2 and Type 3, respectively. FIG. 2, FIG. 3 and FIG. 4 are three-dimensional structures of the basic depth models of Type 1, Type 2 and Type 3, respectively.

The basic depth models of Type 1 and Type 2 shown in FIG. 2 and FIG. 3 are concave type basic depth models. The basic depth model of Type 3 shown in FIG. 4 is a basic depth model of not a concave type but a plane type.

The basic depth model is used to determine a parallax value of the entire frame. The basic depth model is data to shift each pixel on the plane surface in the projecting direction or the retracting direction (the depth direction), which is characteristic of the non-planar type models shown in FIG. 2 to FIG. 4.

The basic depth model generation unit 1 may preliminarily store the basic depth models, or may generate the basic depth models through the step of making a calculation. Each basic depth model may be composed of, for example, luminance signals that define the projecting direction or the retracting direction as a gray level from white to black.

A left-eye viewpoint image signal and a right-eye viewpoint image signal are input into the basic depth model generation unit 1. The basic depth model generation unit 1 selects one of the basic depth models of Type 1 to Type 3 based on either the left-eye viewpoint image signal or the right-eye viewpoint image signal, or both the left-eye viewpoint image signal and the right-eye viewpoint image signal. Alternatively, the basic depth model generation unit 1 may combine two of or all of the basic depth models of Type 1 to Type 3.

For example, the basic depth model generation unit 1 selects or combines the basic depth models as follows. The basic depth model generation unit 1 evaluates the amount of a high-frequency component (a predetermined statistic) included in approximately 20% of the area from the top in each frame. In particular, the basic depth model generation unit 1 divides approximately 20% of the area from the top in each frame into eight-pixel blocks in the respective horizontal and vertical directions, so as to evaluate the following expression (1) for each block to obtain an average value of the blocks as an upper high-frequency component evaluation value top_act.

$$\sum_{i,j} (|Y(i, j) - Y(i+2, j)| + |Y(i, j) - Y(i, j+2)|) \quad (1)$$

Further, the basic depth model generation unit 1 evaluates the amount of the high-frequency component (the predetermined statistic) included in approximately 20% of the area from the bottom in each frame. The basic depth model generation unit 1 also divides approximately 20% of the area from the bottom in each frame into eight-pixel blocks in the respective horizontal and vertical directions, so as to evaluate the above expression (1) for each block to obtain an average value of the blocks as a lower high-frequency component evaluation value bottom_act.

Although the high-frequency component is evaluated for each area approximately 20% from the top and approximately 20% from the bottom in each frame, the range and position of the area may be determined as appropriate. The predetermined statistic is not limited to evaluating the amount of the high-frequency component; however, it is preferable to evaluate the high-frequency component.

The basic depth model generation unit 1 combines the basic depth models of Types 1 to 3 at a predetermined combination ratio according to the upper high-frequency component evaluation value top_act and the lower high-frequency component evaluation value bottom_act. It should be noted that the meaning of "combination" includes the case where only one of Types 1 to 3 is used because there is a possibility that the combination ratio is zero for one or more of the depth models.

Figure 5:
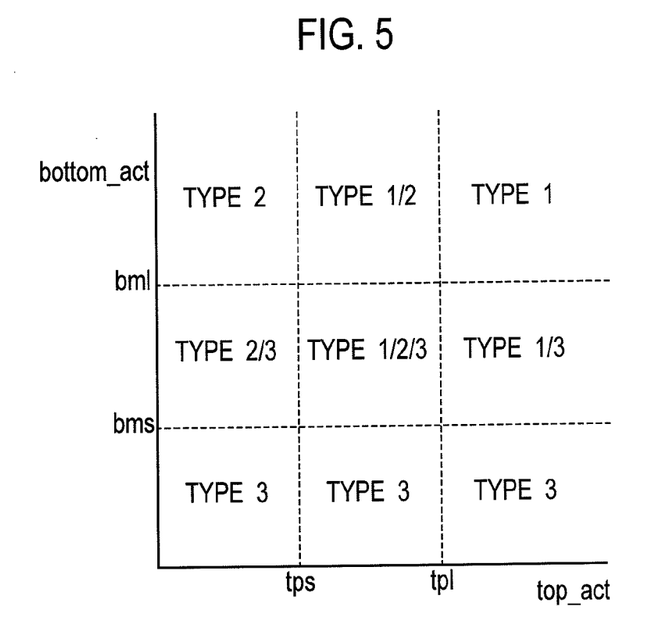
FIG. 5 is an example of a condition for determining a combination ratio for combining the basic depth models generated by the basic depth model generation unit 1 in FIG. 1.

For example, the basic depth model generation unit 1 combines the basic depth models of Types 1 to 3 under the conditions for determining the combination ratio shown in FIG. 5. The horizontal axis in FIG. 5 represents the upper high-frequency component evaluation value top_act, and the vertical axis represents the lower high-frequency component evaluation value bottom_act.

As shown in FIG. 5, when the lower high-frequency component evaluation value bottom_act is less than or equal to the predetermined value bms, the basic depth model generation unit 1 uses the basic depth model of Type 3 regardless of the upper high-frequency component evaluation value top_act. In other words, the combination ratio of each of Types 1 and 2 is set to zero.

When the lower high-frequency component evaluation value bottom_act is greater than the value bms and is less than or equal to the predetermined value bml, the basic depth model generation unit 1 combines the basic depth models of Types 1 to 3 as follows according to the upper high-frequency component evaluation value top_act. When the upper high-frequency component evaluation value top_act is less than or equal to the predetermined value tps, the basic depth model generation unit 1 sets the combination ratio of Type 1 to zero and combines Type 2 with Type 3.

When the upper high-frequency component evaluation value top_act is greater than the value tps and is less than or equal to the predetermined value tpl, the basic depth model generation unit 1 combines all of Types 1 to 3. When the upper high-frequency component evaluation value top_act is greater than the value tpl, the basic depth model generation unit 1 sets the combination ratio of Type 2 to zero, and combines Type 1 with Type 3.

When the lower high-frequency component evaluation value bottom_act is greater than the value bml, the basic depth model generation unit 1 combines the basic depth models of Types 1 to 3 as follows according to the upper high-frequency component evaluation value top_act. When the upper high-frequency component evaluation value top_act is less than or equal to the value tps, the basic depth model generation unit 1 sets the combination ratio of each of Types 1 and 3 to zero, and uses the basic depth model of Type 2.

When the upper high-frequency component evaluation value top_act is greater than the value tps and is less than or equal to the value tpl, the basic depth model generation unit 1 sets the combination ratio of Type 3 to zero, and combines Type 1 with Type 2. When the upper high-frequency component evaluation value top_act is greater than the value tpl, the basic depth mode generation unit 1 sets the combination ratio of each of Types 2 and 3 to zero, and uses the basic depth model of Type 1.

The basic depth model generation unit 1 thus generates and outputs a basic depth model value DPT_MDL as data indicating the parallax value of the combined entire frame under the conditions for determining the combination ratio shown in FIG. 5. The basic depth model value DPT_MDL represents a depth signal in the projecting direction when it is a positive number, and represents a depth signal in the retracting direction when it is a negative number.

It is not required but preferable to combine the several types of the basic depth models according to the upper high-frequency component evaluation value top_act and the lower high-frequency component evaluation value bottom_act. The basic depth model value DPT_MDL may be generated by using at least one of the basic depth models.

The left-eye viewpoint image object information generation unit 2 estimates concave-convex information of the object in the image per pixel unit based on the characteristic of the input left-eye viewpoint image signal, so as to generate and output a left-eye viewpoint concave-convex value DPT_EMBS_L. In the present embodiment, the left-eye viewpoint concave-convex value DPT_EMBS_L is generated based on the red signal (R signal).

One of the reasons why the R signal is used is because of a high probability of the correspondence between the level of the R signal and the concave-convex level of the object under the conditions of front lighting and little difference in brightness in the frame. Another reason is because a warm color such as red is an advancing color in chromatics and therefore tends to be recognized on the front side in the depth direction compared to a cold color.

The left-eye viewpoint image object information generation unit 2 calculates the left-eye viewpoint concave-convex value DPT_EMBS_L by means of the following formula (2). In the formula (2), R_LEFT represents the R signal of the left-eye viewpoint image signal. When the R signal is an 8-bit value in the range from 0 to 255, and R_LEFT is 128, the left-eye viewpoint concave-convex value DPT_EMBS_L is zero.

$$\text{DPT\_EMBS\_L} = \text{R\_LEFT} - 128 \qquad (2)$$

The right-eye viewpoint image object information generation unit 3 calculates a right-eye viewpoint concave-convex value DPT_EMBS_R by means of the following formula (3). In the formula (3), R_RIGHT represents the R signal of the right-eye viewpoint image signal. When R_RIGHT is 128, the right-eye viewpoint concave-convex value DPT_EMBS_R is also zero.

$$\text{DPT\_EMBS\_R} = \text{R\_RIGHT} - 128 \qquad (3)$$

Although the present embodiment employs the R signal to calculate the left-eye viewpoint concave-convex value DPT_EMBS_L and the right-eye viewpoint concave-convex value DPT_EMBS_R, the present invention is not limited to the R signal. The left-eye viewpoint concave-convex value DPT_EMBS_L and the right-eye viewpoint concave-convex value DPT_EMBS_R may be calculated by the green signal (G signal) or the blue signal (B signal), by the combination of the G signal and the B signal, or by a brightness signal.

The adder 4 adds the basic depth model value DPT_MDL output from the basic depth model generation unit 1 to the left-eye viewpoint concave-convex value DPT_EMBS_L output from the left-eye viewpoint image object information generation unit 2, so as to generate a left-eye viewpoint depth value DPT_L by means of the following formula (4).

$$\text{DPT\_L} = \text{DPT\_MDL} + \text{DPT\_EMBS\_L} \qquad (4)$$

The adder 5 adds the basic depth model value DPT_MDL output from the basic depth model generation unit 1 to the right-eye viewpoint concave-convex value DPT_EMBS_R output from the right-eye viewpoint image object information generation unit 3, so as to generate a right-eye viewpoint depth value DPT_R by means of the following formula (5).

$$\text{DPT\_R} = \text{DPT\_MDL} + \text{DPT\_EMBS\_R} \qquad (5)$$

The left-eye viewpoint image signal, the right-eye viewpoint image signal, the left-eye viewpoint depth value DPT_L, the right-eye viewpoint depth value DPT_R and viewpoint array signals output from the viewpoint array signal generation unit 7, are input into the multi-viewpoint image signal generation unit 6. A horizontal synchronization signal Hsync and a vertical synchronization signal Vsync are input into the viewpoint array signal generation unit 7. The viewpoint array signal generation unit 7 generates the viewpoint array signals indicating viewpoints corresponding to pixel positions in the frame based on the horizontal synchronization signal Hsync and the vertical synchronization signal Vsync.

The multi-viewpoint image signal generation unit 6 generates a multi-viewpoint image signal by carrying out a pixel shift on the left-eye viewpoint image signal or the right-eye viewpoint image signal based on the left-eye viewpoint depth value DPT_L, the right-eye viewpoint depth value DPT_R and the viewpoint array signals.

Figure 6:
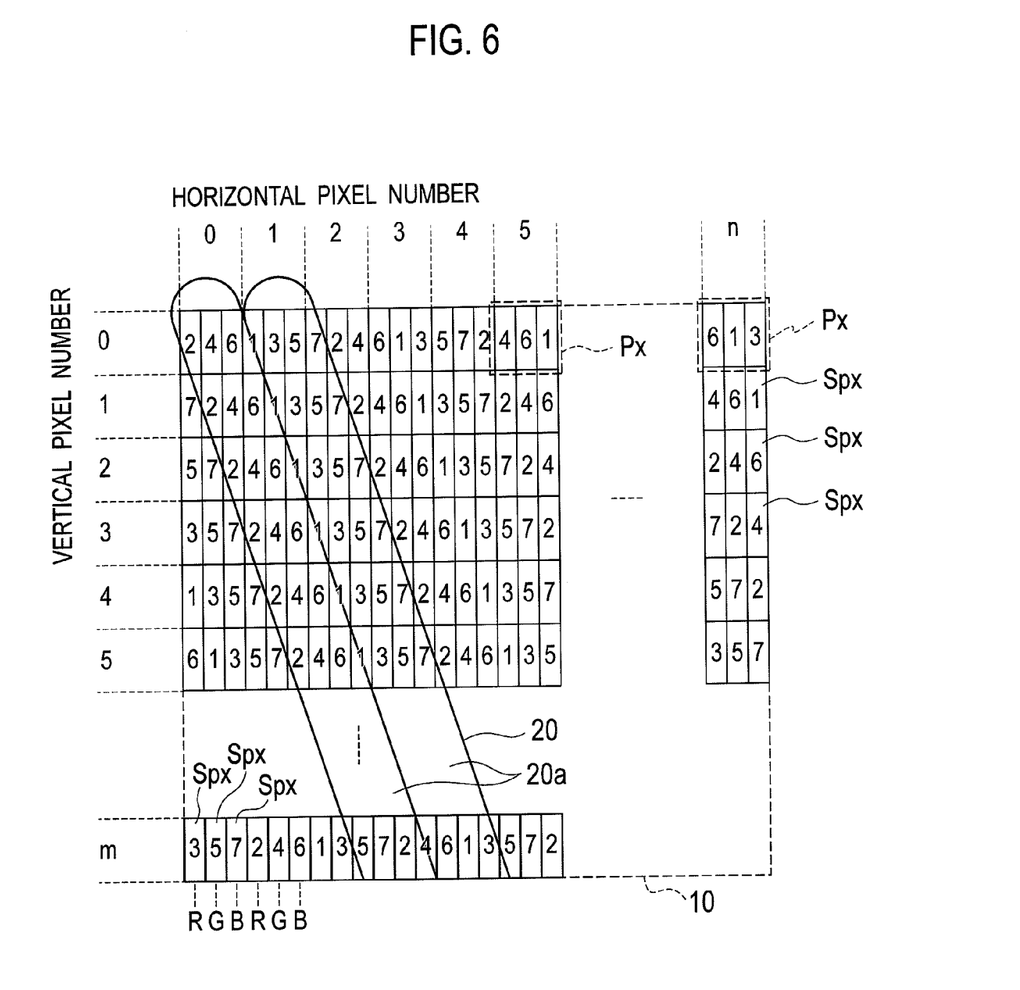
FIG. 6 is a configuration example of a stereoscopic image display to display a multi-viewpoint image signal.

The following is an explanation of the viewpoint array signals generated by the viewpoint array signal generation unit 7 with reference to FIG. 6. FIG. 6 is a configuration example of a stereoscopic image display to display the multi-viewpoint image signal. The stereoscopic image display has a configuration in which a lenticular lens 20 on which a plurality of cylindrical lenses 20a is obliquely arranged, is attached to a display panel 10 such as a liquid crystal panel. Although FIG. 6 shows only two cylindrical lenses 20a to simplify the explanation, the lenticular lens 20 covers the entire part in the display panel 10 where pixels Px are located.

As shown in FIG. 6, the display panel 10 is provided with the pixels Px aligned in "n" lines in the horizontal direction, and aligned in "m" rows in the vertical direction. Note that FIG. 6 partially shows the pixels Px to simplify the explanation. Each pixel Px is composed of subpixels Spx of R, G and B. The subpixels Spx of each of R, G and B are vertically sequentially aligned in lines in a stripe manner.

The stereoscopic image display having such a configuration is a so-called autostereoscopic display capable of displaying autostereoscopic images by providing the multiple viewpoints of the multi-viewpoint image signal in different directions by use of the lenticular lens 20. The numbers indicated in each subpixel Spx shown in FIG. 6 represent the viewpoint numbers in the case where the multi-viewpoint image signal is made up of seven viewpoints. The viewpoint numbers correspond to the viewpoint array signals generated by the viewpoint array signal generation unit 7.

Figure 7:
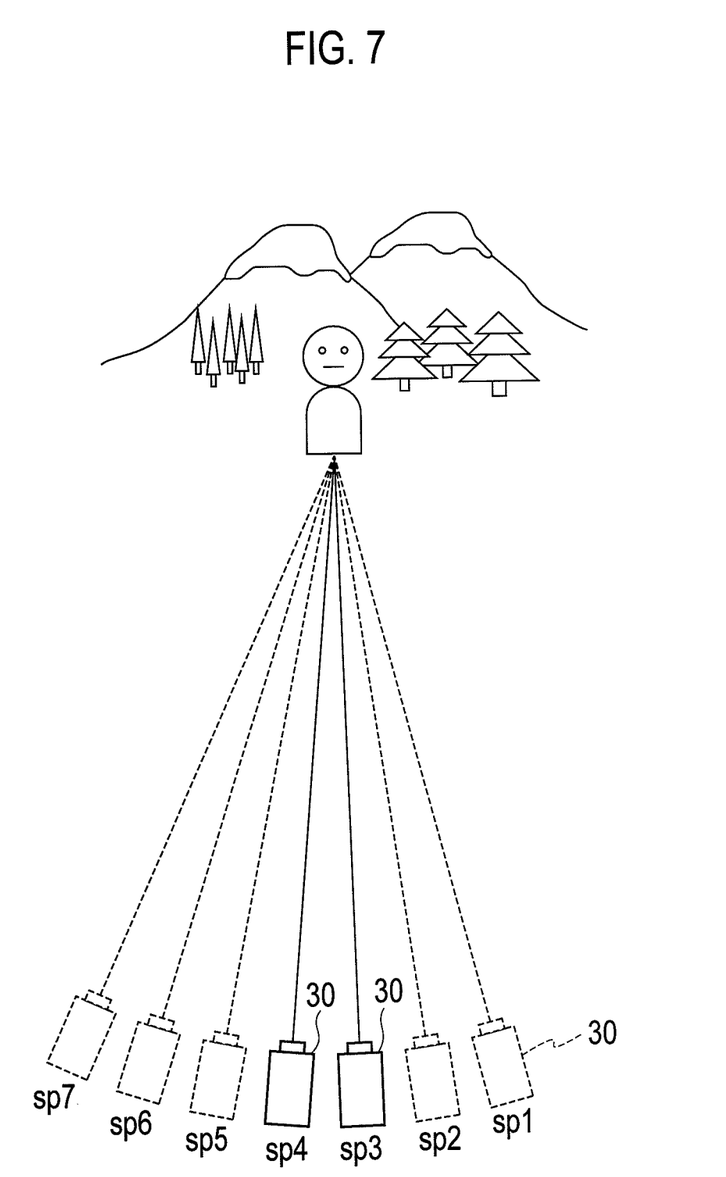
FIG. 7 is a view explaining an example of viewpoint positions of a multi-viewpoint image signal of seven viewpoints.

The following is an explanation of an example of viewpoint positions of the multi-viewpoint image signal of seven viewpoints with reference to FIG. 7. The positions of cameras 30 shown in FIG. 7 to take images of the same object are indicated by viewpoint positions sp1 to sp7. In practice, however, it is not easy to take the images of the object by locating the cameras 30 in the respective viewpoint positions sp1 to sp7. Thus, the cameras 30 are located, for example, only in the viewpoint positions sp3 and sp4 indicated by the solid lines to take the images from two viewpoints and obtain image signals of the two viewpoints. The image signal taken with the camera 30 located in the viewpoint position sp3 is the right-eye viewpoint image signal, and the image signal taken with the camera 30 located in the viewpoint position sp4 is the left-eye viewpoint image signal.

Then, the multi-viewpoint image signal generation unit 6 described in detail below generates viewpoint image signals of the respective viewpoint positions sp1 to sp7 based on the image signals of the two viewpoints (the left-eye viewpoint image signal and the right-eye viewpoint image signal), so as to generate the multi-viewpoint image signal of seven viewpoints. Although the viewpoint position sp3 is defined as a right-eye viewpoint and the viewpoint position sp4 is defined as a left-eye viewpoint, this is merely an example.

The viewpoint image signals of the respective viewpoint positions sp1 to sp7 are displayed in the subpixels Spx denoted by the numbers "1" to "7" in the display panel 10 of the stereoscopic image display shown in FIG. 6, so that the stereoscopic image of the seven viewpoints is displayed.

Figure 8:
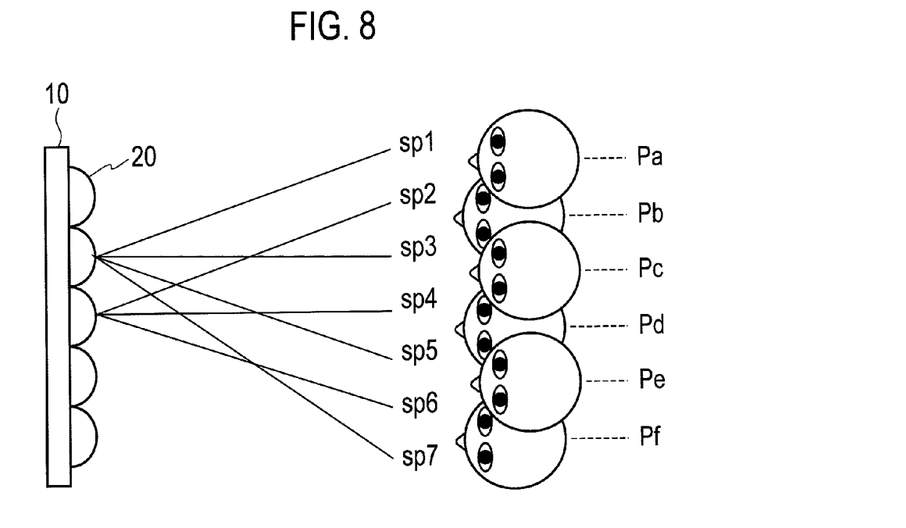
FIG. 8 is an example of how viewpoint positions vary depending on a position of a face viewing the stereoscopic image display.

In particular, as shown in FIG. 8, when the face is located in the position Pa, the viewpoint images of the viewpoint positions sp1 and sp2 can be viewed. When the face is located in the position Pb, the viewpoint images of the viewpoint positions sp2 and sp3 can be viewed. When the face is located in the position Pc, the viewpoint images of the viewpoint positions sp3 and sp4 can be viewed. When the face is located in the position Pd, the viewpoint images of the viewpoint positions sp4 and sp5 can be viewed. When the face is located in the position Pe, the viewpoint images of the viewpoint positions sp5 and sp6 can be viewed. When the face is located in the position Pf, the viewpoint images of the viewpoint positions sp6 and sp7 can be viewed.

Although the lenticular lens 20 is provided in a manner such that the cylindrical lenses 20a are obliquely arranged on the display panel 10, the arrangement is not limited to the oblique manner. The number of the viewpoints of the multi-viewpoint image signal is not limited to seven. The allocation of the viewpoints in the respective subpixels Spx is not limited to that shown in FIG. 6. A slit-type barrier or a lens array may be used instead of the lenticular lens 20, as long as an optical member capable of stereoscopic viewing is provided on the display panel 10.

Figure 9:
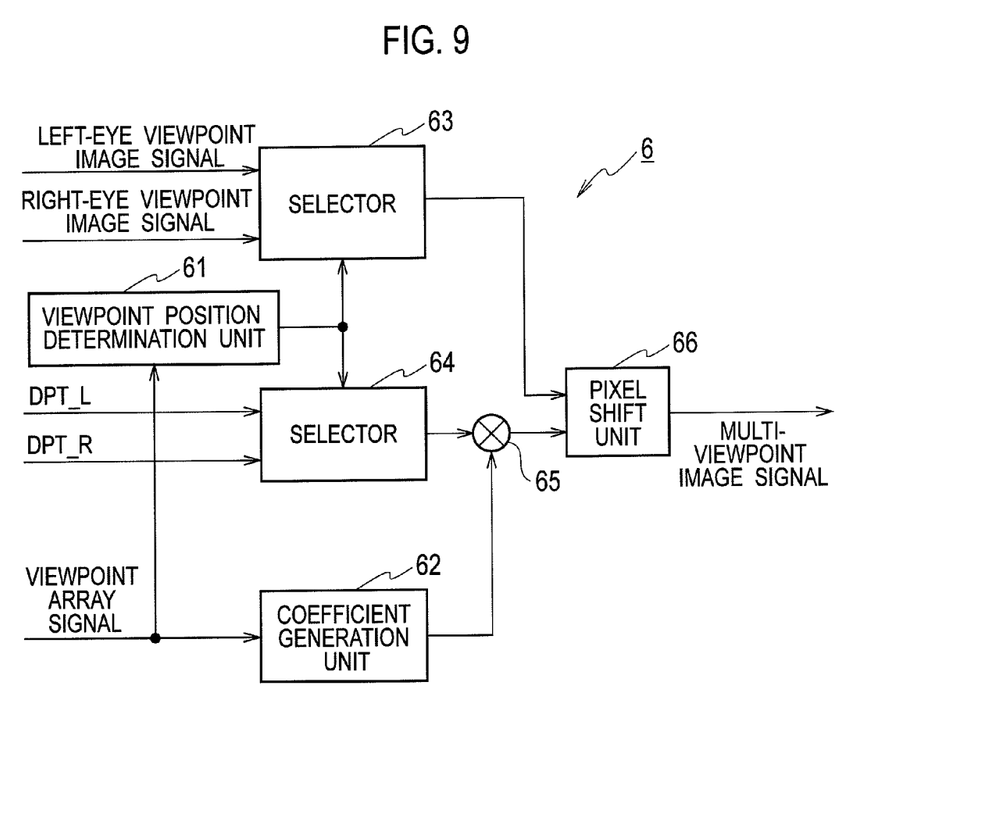
FIG. 9 is a block diagram showing an example of a specific configuration of the multi-viewpoint image signal generation unit 6 in FIG. 1.

The following is an explanation of a specific configuration example of the multi-viewpoint image signal generation unit 6 with reference to FIG. 9. The viewpoint array signals output from the viewpoint array signal generation unit 7 are input into a viewpoint position determination unit 61 and a coefficient generation unit 62. In the case of the multi-viewpoint image signal of seven viewpoints, the viewpoint array signals may be 9-bit digital values, since R, G and B can each be expressed by 3-bit viewpoint numbers.

In the viewpoint position determination unit 61 and the coefficient generation unit 62, the viewpoint positions for providing the multi-viewpoints based on the left-eye viewpoint image signal and the right-eye viewpoint image signal, and the viewpoint positions corresponding to each of the right-eye viewpoint and the left-eye viewpoint, are preliminarily determined.

The viewpoint position determination unit 61 determines whether each of the viewpoint image signals generated by an image shift unit 66 is closer to the left-eye viewpoint image position or the right-eye viewpoint image position.

Figure 10:
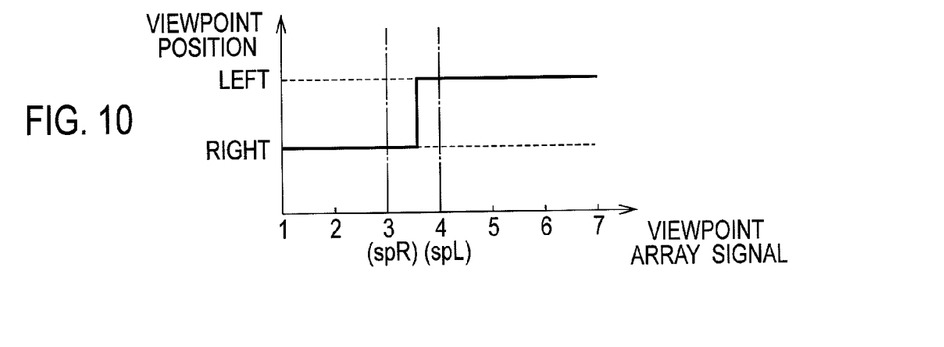
FIG. 10 is a graph explaining a determination operation by the viewpoint position determination unit 61 in FIG. 9.

The following is an explanation of the determination operation by the viewpoint position determination unit 61 with reference to FIG. 10. As is explained in FIG. 7 above, the viewpoint position sp3 is the right-eye viewpoint, and the viewpoint position sp4 is the left-eye viewpoint. In FIG. 10, the viewpoint position sp3 is defined as spR, and the viewpoint position sp4 is defined as spL. The viewpoint position determination unit 61 determines that the right-eye viewpoint is the closer one when the viewpoint array signal is any of 1 to 3, and determines that the left-eye viewpoint is the closer one when the viewpoint array signal is any of 4 to 7.

In the case where the viewpoint position spR of the right-eye viewpoint and the viewpoint position spL of the left-eye viewpoint are set to viewpoint positions other than the viewpoint positions sp3 and sp4, the viewpoint position determination unit 61 sets the viewpoint position to the left or right one depending on whether the respective viewpoint array signals 1 to 7 are closer to the viewpoint position spR of the right-eye viewpoint or the viewpoint position spL of the left-eye viewpoint. The information about the right-left determination of the viewpoint position by the viewpoint position determination unit 61, is input into selectors 63 and 64.

Based on the information about the input right-left determination of the viewpoint position, the selector 63 selects and outputs the left-eye viewpoint image signal when the viewpoint position determination unit 61 determines that the viewpoint position is located on the left side, and selects and outputs the right-eye viewpoint image signal when the viewpoint position determination unit 61 determines that the viewpoint position is located on the right side. Similarly, based on the information about the input right-left determination of the viewpoint position, the selector 64 selects and outputs the left-eye viewpoint depth value DPT_L when the viewpoint position determination unit 61 determines that the viewpoint position is located on the left side, and selects and outputs the right-eye viewpoint depth value DPT_R when the viewpoint position determination unit 61 determines that the viewpoint position is located on the right side.

The coefficient generation unit 62 generates coefficients according to the viewpoint positions denoted by the viewpoint array signals. In particular, the coefficient generation unit 62 generates the coefficients to increase or decrease the left-eye viewpoint depth value DPT_L or the right-eye viewpoint depth value DPT_R according to the distance between the respective viewpoint positions of the multi-viewpoint image signal generated by the pixel shift unit 66 and the viewpoint position of the left-eye viewpoint image or the right-eye viewpoint image.

Figure 11A:
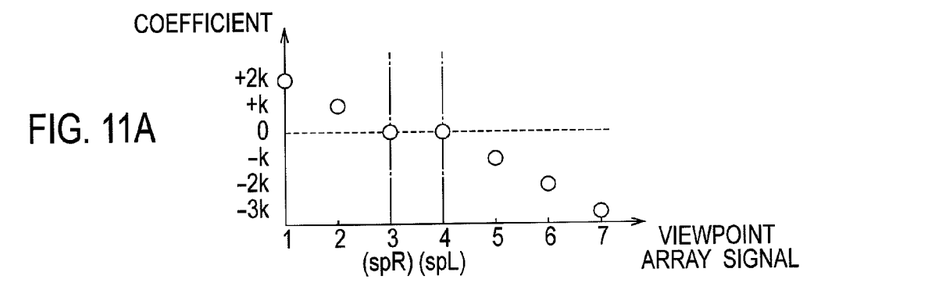
FIG. 11A to FIG. 11C are graphs explaining coefficients generated by the coefficient generation unit 62 in FIG. 9.
Figure 11B:
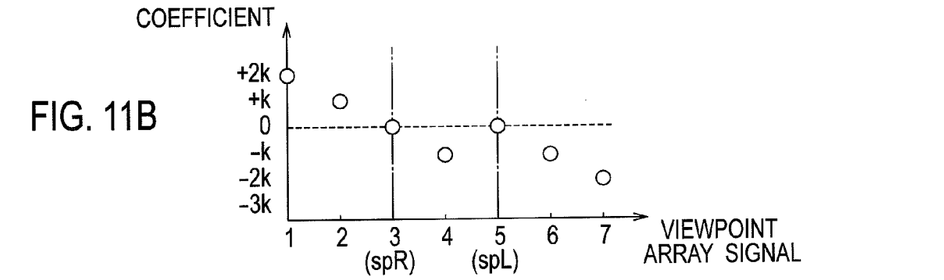
Figure 11C:
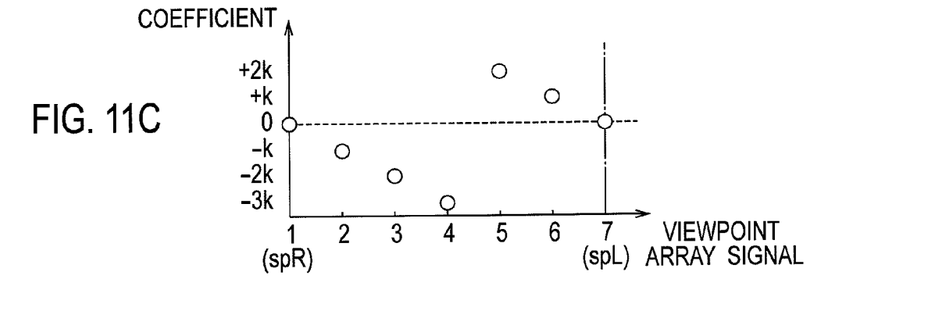

The following is an explanation of the coefficients generated by the coefficient generation unit 62 when the viewpoint position spR of the right-eye viewpoint is set to the viewpoint position sp3 and the viewpoint position spL of the left-eye viewpoint is set to the viewpoint position sp4, with reference to FIG. 11A. In FIG. 11A to FIG. 11C, the horizontal axis represents the numbers 1 to 7 of the viewpoints denoted by the viewpoint array signals, and the vertical axis represents the coefficients. With regard to the vertical axis, the coefficients above 0 are positive values greater than 0, and the coefficients below 0 are negative values less than 0.

In FIG. 11A, the viewpoint positions sp3 and sp4 are the right-eye viewpoint and the left-eye viewpoint, respectively. When the viewpoint array signal indicates the viewpoint position sp3, the left-eye viewpoint depth value DPT_L or the right-eye viewpoint depth value DPT_R selected by the selector 64 is required to be set to zero so that the right-eye viewpoint image signal selected by the selector 63 is not shifted by the pixel shift unit 66. When the viewpoint array signal indicates the viewpoint position sp4, the left-eye viewpoint depth value DPT_L or the right-eye viewpoint depth value DPT_R selected by the selector 64 is required to be set to zero so that the left-eye viewpoint image signal selected by the selector 63 is not shifted by the pixel shift unit 66.

Thus, as shown in FIG. 11A, the coefficient generation unit 62 generates coefficients of zero when the viewpoint array signals indicate the viewpoint positions sp3 and sp4.

When the viewpoint array signals indicate the viewpoint positions sp2 and sp1, since the viewpoint position sp2 is located outside (on the right side) of the viewpoint position sp3, and the viewpoint position sp1 is located outside of the viewpoint position sp2, the right-eye viewpoint depth value is required to be increased as the viewpoint positions separate from the viewpoint position sp3.

Thus, when the viewpoint array signals indicate the viewpoint positions sp2 and sp1, the coefficient generation unit 62 generates coefficients that are positive numbers and increase in size as the viewpoint positions separate from the viewpoint position sp3, as shown in FIG. 11A.

When the viewpoint array signals indicate the viewpoint positions sp5 to sp7, since the viewpoint position sp5 is located outside (on the left side) of the viewpoint position sp4, the viewpoint position sp6 is located outside of the viewpoint position sp5, and the viewpoint position sp7 is located outside of the viewpoint position sp6, the left-eye viewpoint depth value is required to be increased as the viewpoint positions separate from the viewpoint position sp4.

Thus, when viewpoint array signals indicate the viewpoint positions sp5 to sp7, the coefficient generation unit 62 generates coefficients that are negative numbers and sequentially increase in size as the viewpoint positions separate from the viewpoint position sp4, as shown in FIG. 11A.

The reason why the coefficients of the viewpoint positions sp5 to sp7 are negative numbers in FIG. 11A is because the right-left direction of shifting relating to the signs of the depth values is reversed when the left viewpoint images are generated, with respect to the case where right viewpoint images are generated.

In particular, when viewpoint images on the right side of the original image are generated, textures of the images to be displayed in front of the display (the depth value>0) are shifted to the left corresponding to the depth values, so that closer images are displayed on the left of the viewer. However, when the images of the viewpoints on the left side of the original image are generated, the images are displayed behind the display if the textures of the corresponding parts are shifted to the left.

Similarly, when the images of the viewpoints on the right side of the original image is generated, the textures of the images to be displayed behind the display (the depth value<0) are shifted to the right corresponding to the depth values, so that farther images are displayed on the right of the viewer. However, when the images of the viewpoints on the left side of the original image are generated, the images are displayed in front of the display if the textures of the corresponding parts are shifted to the right.

Accordingly, when the pixel shift unit 66 generates the images of the viewpoints on the left side of the original image, the coefficients are required to be generated in a manner such that the signs of the depth values are reversed.

FIG. 11B shows the coefficients generated by the coefficient generation unit 62 when the viewpoint position spR of the right-eye viewpoint is set to the viewpoint position sp3, and the viewpoint position spL of the left-eye viewpoint is set to the viewpoint position sp5.

In this case, since the viewpoint position sp4 is located inside (on the left side) of the viewpoint position sp3, the negative coefficient is generated at the viewpoint position sp4 in a manner such that the sign of the right-eye viewpoint depth value DPT_R is reversed to generate the image of the viewpoint on the left side of the right-eye viewpoint image signal. Alternatively, since the viewpoint position sp4 is located inside (on the right side) of the viewpoint position sp5, the coefficient may be generated at the viewpoint position sp4 in a manner such that the sign of the left-eye viewpoint depth value DPT_L is not reversed to generate the image of the viewpoint on the right side of the left-eye viewpoint image signal.

Here, the pixel shift unit 66 may generate the image signal of the viewpoint position sp4 based on either the left-eye viewpoint image or the right-eye viewpoint image. Therefore, the viewpoint position determination unit 61 may define the viewpoint position sp4 either as the right-eye viewpoint or as the left-eye viewpoint, and the selector 63 may select either the left-eye viewpoint image signal or the right-eye viewpoint image signal.

The selector 64 may select the left-eye viewpoint depth value DPT_L when the selector 63 selects the left-eye viewpoint image signal, and may select the right-eye viewpoint depth value DPT_R when the selector 63 selects the right-eye viewpoint image signal.

In the case where a plurality of viewpoint positions is present inside of the viewpoint positions spR and spL, for example, when the viewpoint position of the right-eye viewpoint spR is set to the viewpoint position sp1 and the viewpoint position of the left-eye viewpoint spL is set to the viewpoint position sp7, the coefficients may be generated as shown in FIG. 11C.

A multiplier 65 multiplies the left-eye viewpoint depth value DPT_L or the right-eye viewpoint depth value DPT_R by each coefficient set as shown in FIG. 11A, and supplies the value to the pixel shift unit 66. The specific values of the coefficients of the viewpoint positions sp1, sp2 and spy to sp7 may be determined as appropriate.

The pixel shift unit 66 carries out the pixel shift for the left-eye viewpoint image signals output from the selector 63 in accordance with the depth values output from the multiplier 65, so as to generate the image signals of the viewpoints of the viewpoint positions sp4 to sp7. Further, the pixel shift unit 66 carries out the pixel shift for the right-eye viewpoint image signals output from the selector 63 in accordance with the depth values output from the multiplier 65, so as to generate the image signals of the viewpoints of the viewpoint positions sp1 to sp3.

The pixel shift unit 66 thus generates and outputs the multi-viewpoint image signal made up of the viewpoint positions sp1 to sp7.

As described above, according to the present embodiment, the multi-viewpoint image signal is generated from the image signal of the left viewpoint generated only from the left-eye viewpoint image signal, and the image signal of the right viewpoint generated only from the right-eye viewpoint image signal. Therefore, the multi-viewpoint image signal having no distortion can be obtained without being influenced by occlusion. It should be noted that "having no distortion" does not mean that there is no distortion at all, but means that there is no influence of occlusion.

The present invention is not limited to the embodiment described above, and it will be apparent to those skilled in the art that various modifications and improvements can be made within the scope of the present invention.

What is claimed is:

1. A multi-viewpoint image generation method, comprising:
   estimating concave-convex information of an object in an image based on a left-eye viewpoint image signal so as to generate a left-eye viewpoint concave-convex value;
   estimating the concave-convex information of the object in the image based on a right-eye viewpoint image signal so as to generate a right-eye viewpoint concave-convex value;
   adding a basic depth model that indicates a depth value of a predetermined scene structure in a frame to the left-eye viewpoint concave-convex value so as to generate a left-eye viewpoint depth value;
   adding the basic depth model to the right-eye viewpoint concave-convex value so as to generate a right-eye viewpoint depth value;
   generating a viewpoint array signal that maps one of a set of viewpoints to a pixel position in the frame;
   determining whether the viewpoint indicated by the viewpoint array signal is closer to a left-eye viewpoint or a right-eye viewpoint;
   generating a coefficient that is a positive number and increases in size as a distance of the viewpoint from a right side of the left-eye viewpoint or the right-eye viewpoint increases, and generating a coefficient that is a negative number and increases in size as a distance of the viewpoint from a left side of the left-eye viewpoint or the right-eye viewpoint increases;
   selecting only one of either the left-eye viewpoint image signal or the right-eye viewpoint image signal depending on whether the viewpoint indicated by the viewpoint array signal is closer to the left-eye viewpoint or the right-eye viewpoint, in both cases when generating a multi-viewpoint image signal including an image signal of a viewpoint outside the left-eye viewpoint or the right-eye viewpoint, and when generating a multi-viewpoint image signal including an image signal of a viewpoint between the left-eye viewpoint and the right-eye viewpoint;
   selecting only one of either the left-eye viewpoint depth value or the right-eye viewpoint depth value depending on whether the viewpoint indicated by the viewpoint array signal is closer to the left-eye viewpoint or the right-eye viewpoint, in both cases when generating a multi-viewpoint image signal including an image signal of a viewpoint outside the left-eye viewpoint or the right-eye viewpoint, and when generating a multi-viewpoint image signal including an image signal of a viewpoint between the left-eye viewpoint and the right-eye viewpoint;
   multiplying, by the coefficient, the left-eye viewpoint depth value or the right-eye viewpoint depth value selected; and
   carrying out a pixel shift on the left-eye viewpoint image signal and the right-eye viewpoint image signal according to the left-eye viewpoint depth value or the right-eye viewpoint depth value multiplied by the coefficient, so as to generate a multi-viewpoint image signal.

2. The multi-viewpoint image generation method according to claim 1, further comprising either selecting one of a plurality of basic depth models that indicates respective depth values of a plurality of based scene structures in the frame, or generating a basic depth model by combining the plurality of basic depth models.

3. The multi-viewpoint image generation method according to claim 2, wherein the selecting one of the plurality of basic depth models, or the combining of the plurality of basic depth models, is accomplished in accordance with a degree of a high-frequency component included in a predetermined region in the frame.

4. The multi-viewpoint image generation method according to claim 1, wherein each of estimating the concave-convex information of the object in the image based on the left-eye viewpoint image signal and estimating the concave-convex information of the object in the image based on the right-eye viewpoint image signal is based on a red signal.

* * * * *